(12) United States Patent
Kuenemund et al.

(10) Patent No.: US 9,768,128 B2
(45) Date of Patent: Sep. 19, 2017

(54) CHIP AND METHOD FOR DETECTING AN ATTACK ON A CHIP

(71) Applicant: Infineon Technologies AG, Neubiberg (DE)

(72) Inventors: Thomas Kuenemund, Munich (DE); Jan Otterstedt, Unterhaching (DE); Christoph Saas, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 216 days.

(21) Appl. No.: 14/166,930

(22) Filed: Jan. 29, 2014

(65) Prior Publication Data

US 2015/0214163 A1 Jul. 30, 2015

(51) Int. Cl.
*G01R 31/26* (2014.01)
*G01R 31/30* (2006.01)
*H01L 23/00* (2006.01)
*G06F 21/87* (2013.01)
*G06F 21/88* (2013.01)
(Continued)

(52) U.S. Cl.
CPC .............. *H01L 23/57* (2013.01); *G06F 21/87* (2013.01); *G06F 21/88* (2013.01); *H01L 23/576* (2013.01); *G01R 31/2884* (2013.01); *H01L 22/34* (2013.01); *H01L 2924/0002* (2013.01)

(58) Field of Classification Search
CPC ... H01L 23/564; H01L 23/57; H01L 2924/00; H01L 2924/00012; H01L 2224/73265; H01L 22/12; H01L 2924/0002; H01L 2924/014; G01R 31/2851; G01R 33/5608; G01R 33/56563; G01R 33/5659; G01R 33/3415; G01R 33/361401; G01M 99/005; G01M 15/14; G01M 99/00; G01M 7/00
USPC .......................... 324/762.01, 762.02, 762.05, 324/762.06–762.09, 763.01, 760.01, 719, 324/724, 71.5, 760.02, 762.08–762.09, 324/322; 702/182–185; 438/14–18
See application file for complete search history.

(56) References Cited

U.S. PATENT DOCUMENTS 6,251,705 B1 * 6/2001 Degani ................... H01L 24/81
257/E21.511
7,115,912 B2 * 10/2006 Kash .................... G01R 31/311
257/83

(Continued)

OTHER PUBLICATIONS

Polyteknisk, Chapter 6, Memory, http://www.polyteknisk.dk/related_materials/9780789736970_Chapter_6.pdf, p. 1-72, Dec. 12, 2015.*

(Continued)

*Primary Examiner* — Jermele M Hollington
*Assistant Examiner* — Taqi Nasir
(74) *Attorney, Agent, or Firm* — Viering, Jentschura & Partner mbB

(57) ABSTRACT

According to one embodiment, a chip is described comprising a transistor level, a semiconductor region in, below, or in and below the transistor level, a test signal circuit configured to supply a test signal to the semiconductor region, a determiner configured to determine a behavior of the semiconductor region in response to the test signal and a detector configured to detect a change of geometry of the semiconductor region based on the behavior and a reference behavior of the semiconductor region in response to the test signal.

18 Claims, 14 Drawing Sheets

(51) Int. Cl.
*G01R 31/28* (2006.01)
*H01L 21/66* (2006.01)

(56) References Cited

U.S. PATENT DOCUMENTS

| | | | |
|---|---|---|---|
| 2009/0058456 A1* | 3/2009 | Okayasu | G05B 19/41875 324/750.3 |
| 2009/0085589 A1* | 4/2009 | Hsieh | G01R 31/2822 324/762.01 |
| 2010/0225380 A1* | 9/2010 | Hsu | H01L 23/576 327/514 |
| 2011/0018575 A1* | 1/2011 | Chen | G01R 31/2621 324/762.02 |
| 2011/0108932 A1* | 5/2011 | Benzel | G01L 9/0073 257/415 |
| 2012/0049881 A1* | 3/2012 | Johnson | G01R 31/2894 324/762.01 |
| 2012/0274348 A1* | 11/2012 | Shin | G01B 31/318513 324/762.01 |

OTHER PUBLICATIONS

Burghartz, Joachim. Ultra-thin Chip Technology and Applications, Springer Publ,2011,p. 122-123,125,128,132,137,138.*
Ramm, Peter. Handbook of Wafer Bonding, Wiley-VCH, 2012, Sec. 15.4.2.*
C. Helfmeier et al., "Breaking and Entering through the Silicon", http://nedocs.net/ccs2013.pdf; pp. 1-11.
Tonekaboni, Keywan, "Einbruch durch die Silizium-Rückwand", c't magazin, Issue 1, 2014, pp. 68-70 with its English abstract.

* cited by examiner

CHIP AND METHOD FOR DETECTING AN ATTACK ON A CHIP

TECHNICAL FIELD

The present disclosure relates to chips and methods for detecting an attack on a chip.

BACKGROUND

New types of attacks on security chips have become possible due to newly developed techniques that are used to thin down chips to allow access to the circuitry from the chip backside. Approaches such as shielding, which may be employed for protection of the front side of a chip, are typically not suitable for the protection of the backside of a chip or require special and costly processing steps.

Accordingly, efficient approaches that allow detection of backside attacks are desirable.

SUMMARY

According to one embodiment, a chip is provided including a transistor level, a semiconductor region in, below, or in and below the transistor level, a test signal circuit configured to supply a test signal to the semiconductor region, a determiner configured to determine a behavior of the semiconductor region in response to the test signal and a detector configured to detect a change of the semiconductor region's geometry based on the behavior and a reference behavior of the semiconductor region in response to the test signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

New attack scenarios on security chips are on the rise which become possible due to newly developed techniques that are used to thin down chips to allow access to the chip's circuitry from the backside. In the following, embodiments are described that allow detecting such a manipulation and which may be efficiently implemented, e.g. do not necessitate process technology extensions or require dedicated chip packages, and can thus be applied for mass products without leading to unacceptable costs.

Figure 1:
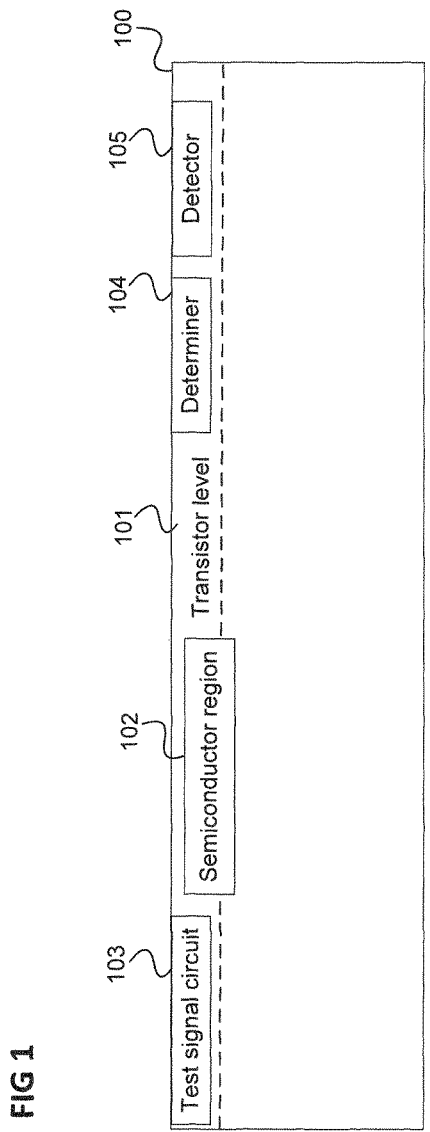
FIG. 1 shows a chip according to an embodiment.

FIG. 1 shows a chip 100 according to an embodiment.

The chip 100 includes a transistor level 101 and a semiconductor region 102 in, below, or in and below the transistor level.

Further, the chip 100 includes a test signal circuit 103 configured to supply a test signal to the semiconductor region 102.

The chip 100 includes a determiner 104 (e.g. a determining circuit) configured to determine a behavior of the semiconductor region in response to the test signal and a detector 105 (e.g. a detection circuit) configured to detect a change of the semiconductor region's geometry based on the behavior and a reference behavior of the semiconductor region in response to the test signal.

In other words, according to one embodiment, to detect a change of geometry, as it for example typically occurs in a backside attack where the substrate and possibly regions such as wells within the substrate are thinned, the behavior of a semiconductor region in response to a test signal is checked on the basis of a reference behavior of the semiconductor region in response to the test signal (e.g. determined earlier or by means of a similar semiconductor region). Thus, an integrity check of the chip (e.g. implementing an integrated circuit) is performed and one or more components of the chip are for example disabled if the integrity check fails, i.e. if a change of geometry of the chip is detected. The change of (the semiconductor region's) geometry may for example be a mechanical change.

The semiconductor region may be a semiconductor region that is located in, below, or in and below the transistor level of the chip, e.g. is a part of the transistor level or is at least partially included in the transistor level. The transistor level of the chip can be understood as the region of the chip where transistors are formed, typically by means of doped regions within the substrate, for example including the channel regions of the transistors or source and drain regions of transistors. For example, the semiconductor region is located in, below, or in and below a region of the chip containing the active regions of transistors.

It should be noted that by avoiding backside attacks which include thinning of the substrate or thinning of wells allows avoiding attacks that would be possible because of the thinning, for example light attacks, ion beam attacks or electron beam attacks.

According to one embodiment, the chip includes a substrate and the semiconductor region is a substrate region.

For example, the semiconductor region includes or is a region of the substrate.

The semiconductor region may also include or be a well in the substrate.

The semiconductor region may include or be a doped region.

The change of geometry is for example a change of the thickness of at least a part of the semiconductor region.

According to one embodiment, the detector is configured to detect a change of geometry of the semiconductor region based on the behavior and the reference behavior by checking whether the behavior matches the reference behavior.

For example, checking whether the behavior matches the reference behavior includes checking whether a value representing the behavior lies within a predetermined range of a value representing the reference behavior.

The detector is for example configured to output an alarm signal if it detects a change of geometry of the semiconductor region.

According to one embodiment, the chip further includes a controller configured to prevent the function of one or more components of the chip if the detector detects a change of geometry of the semiconductor region.

The behavior for example includes an electrical parameter of the semiconductor region.

For example, the behavior includes at least one of a capacity, a resistance or a time constant of the semiconductor region.

According to one embodiment, the semiconductor region includes a plurality of semiconductor subregions, wherein the chip includes, for each semiconductor subregion, at least one switch to connect the semiconductor subregion with a supply potential and the test circuit is configured to disconnect each semiconductor subregion from the supply potential by means of the at least one switch before supplying the test signal to the semiconductor region.

For example, the semiconductor region is a serial connection of the plurality of semiconductor subregions.

The chip may for example include a memory storing the reference behavior.

According to one embodiment, the chip includes a further semiconductor region, a further test circuit configured to supply a further test signal to the further semiconductor region, and a further determiner configured to determine a behavior of the further semiconductor region in response to the test signal wherein the detector is configured to use the behavior of the further semiconductor region in response to the test signal as the reference behavior of the semiconductor region in response to the test signal.

Figure 2:
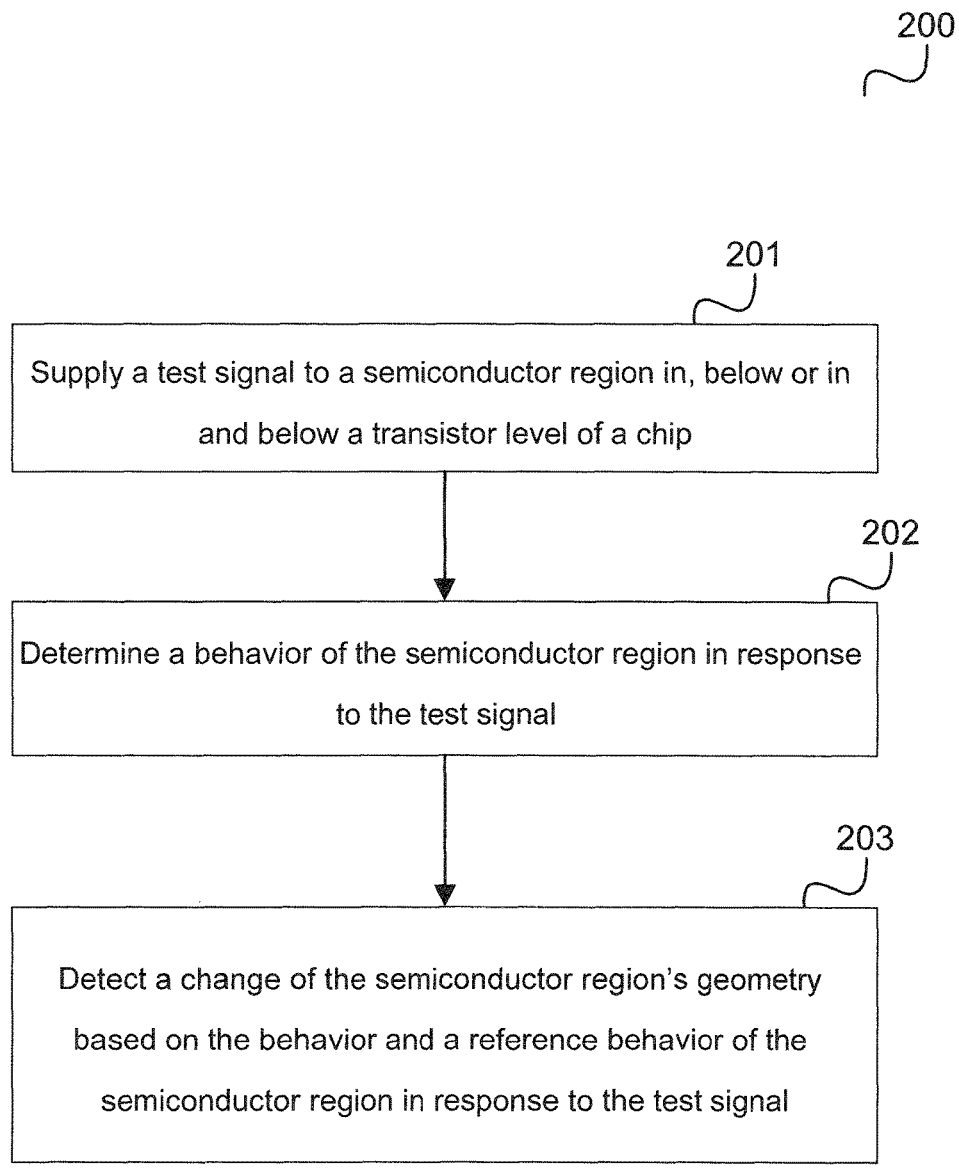
FIG. 2 shows a flow diagram according to an embodiment.

According to one embodiment, a method as illustrated in FIG. 2 is provided.

FIG. 2 shows a flow diagram 200.

The flow diagram 200 illustrates a method for detecting an attack on a chip.

In 201, a test signal is supplied to a semiconductor region in, below, or in and below a transistor level of a chip.

In 202, a behavior of the semiconductor region in response to the test signal is determined.

In 203, a change of geometry of the semiconductor region is detected based on the behavior and a reference behavior of the semiconductor region in response to the test signal.

It should be noted that embodiments described in context of the chip 100 are analogously valid for the method illustrated in FIG. 2 and vice versa.

In the following, embodiments are described in more detail. Specifically, in the following, embodiments are described in which the geometrical and electrical properties of active n-well-p-well arrays which are a CMOS technology feature for integrating nMOS transistors (inside p wells) and pMOS transistors (inside n wells) are used.

Figure 3:
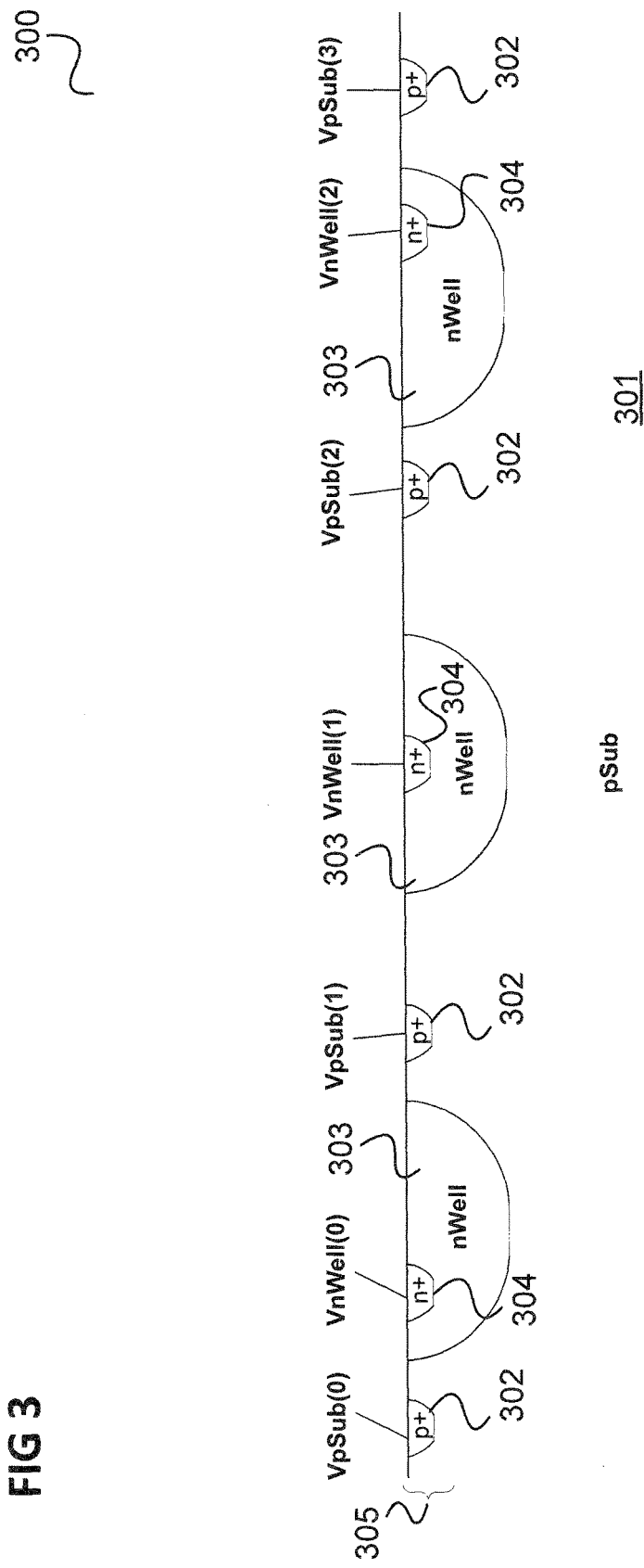
FIG. 3 shows a chip according to one embodiment.

FIG. 3 shows a chip 300.

The chip 300 includes a p substrate 301 (i.e. a p doped substrate). A plurality of p+ substrate connection regions 302 (i.e. highly p doped regions, e.g. more highly doped than p substrate 301) are formed within the p substrate 301.

Further, a plurality of n wells (i.e. n doped wells) 303 are formed within the p substrate 301. A plurality of n+ connection regions 304 (i.e. highly n doped regions, e.g. more highly doped than n wells 303) are formed within the n wells 303.

The respective local bulk potentials VpSub(j) (for the p+ substrate connection regions 302) and VnWell(k) (for the n well connection regions 304) are indicated as well in FIG. 3. The connection regions 302, 304 may for example be connected via low-ohmic connections to the supply voltages, i.e. such that VpSub(j)=VSS for all j=0, 1, . . . , and VnWell(k)=VDD for all k=0, 1, 2, . . . .

The chip 300 is an example of a chip manufactured in a dual well CMOS (complementary metal oxide semiconductor) process. Accordingly, n channel transistors (not shown) are for example formed in a transistor level 305 within the p substrate and p channel transistors (not shown) are for example formed in the transistor level 305 within the n wells 303. These transistors may for example be connected to form logic gates.

Figure 4:
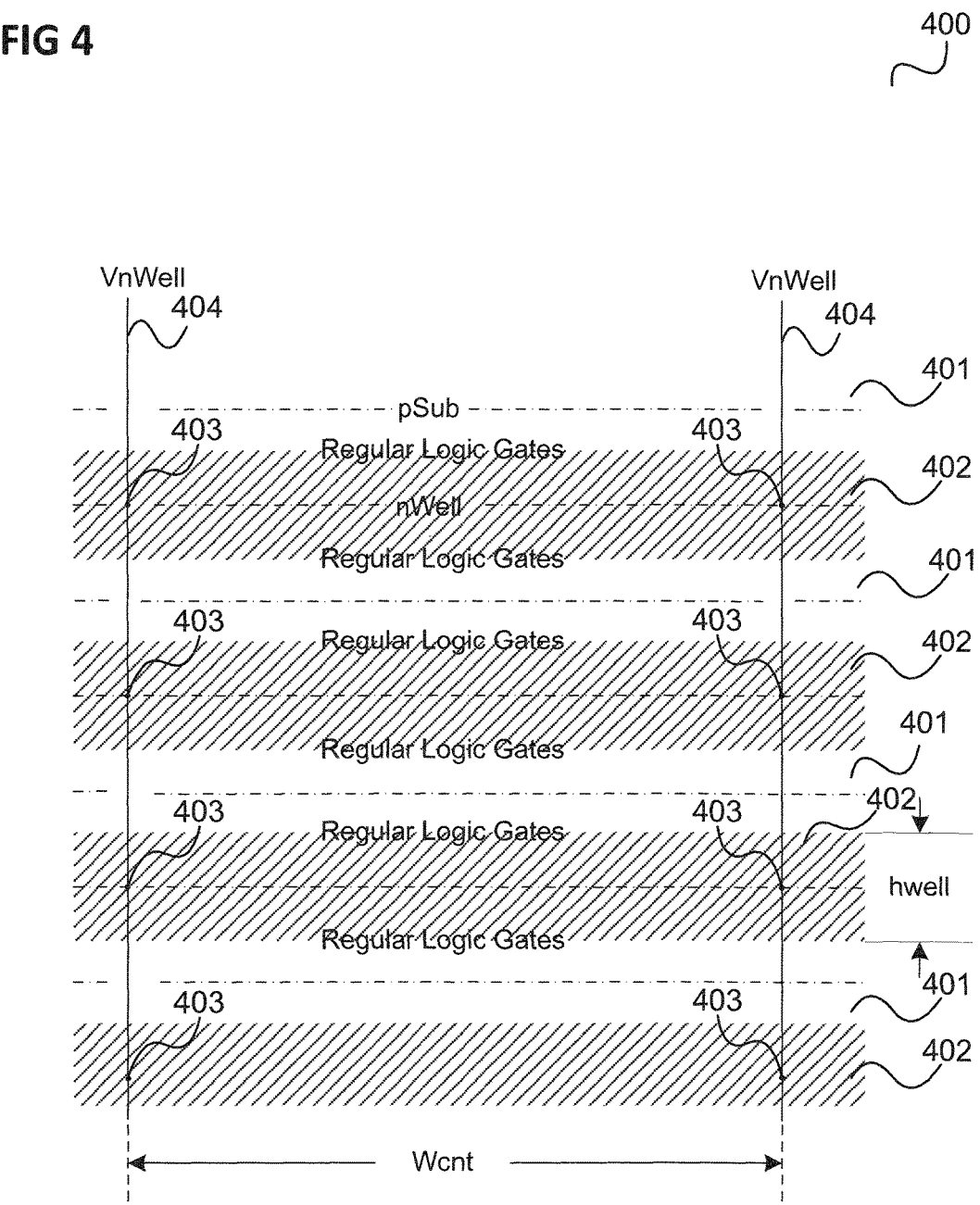
FIG. 4 shows a top view of the chip of FIG. 3.

FIG. 4 shows a top view of the chip 300 of FIG. 3.

The cross section of FIG. 3 is for example a cross section of the chip 400 shown in FIG. 4 from top to bottom.

Accordingly, chip 400 includes p substrate regions 401 separated by n wells 402. The n wells 402 are supplied by n well connection regions 403 (corresponding to n well connection regions 304) by means of n well voltage lines 404 with the n well supply voltage VnWell.

It should be noted that in FIG. 4 and the following figures, the center of a region (e.g. a well) is marked by a dot and dash line.

The distance Wcnt between two consecutive voltage lines 404 amounts to about 50 μm whereas the well height hwell is approximately 2 μm for deep submicron CMOS technologies.

According to one embodiment, the n wells 402 are switchably connected to the n well voltage lines 404. This is illustrated in FIG. 5.

Figure 5:
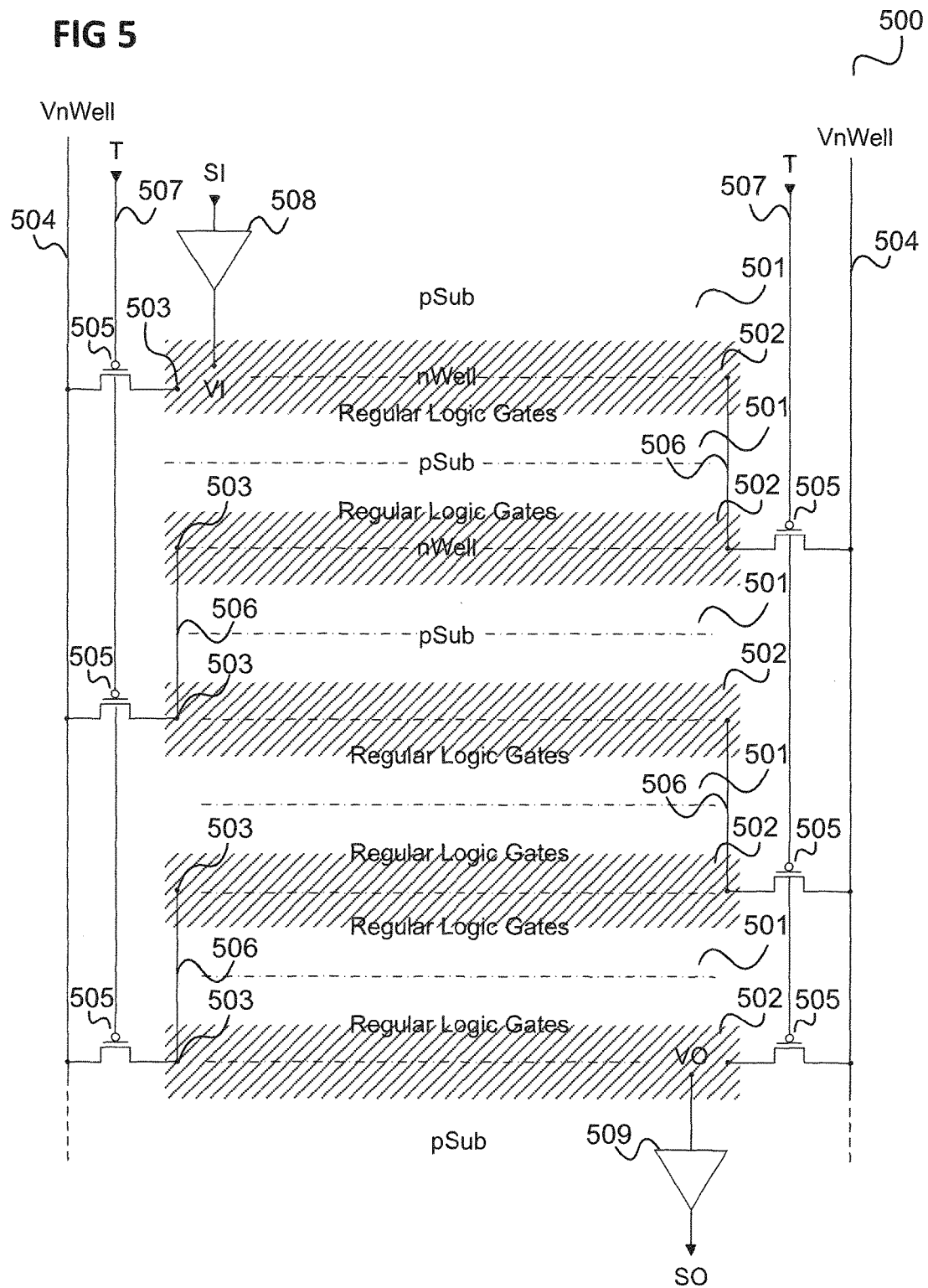
FIG. 5 shows a top view of a chip according to one embodiment.

FIG. 5 shows a top view of a chip 500.

Similar to FIG. 4, the chip 500 includes p substrate regions 501 separated by n wells 502 including n well connection regions 503 and n well voltage lines 504.

The n well voltage lines 504 are switchably connected to the n well connection regions 503 by means of p channel transistors 505 whose gate terminals are connected to control lines 507.

In normal operation (i.e. not test mode) the gates of the p channel transistors 505 are supplied with a test signal T set to 0 (i.e. for example low supply voltage VSS) such that the p channel transistors 505 are switched on and connect the n wells 502 to VnWell.

Furthermore the n wells 502 are serially connected via the n well connection regions 503 by means of n well connection lines 506 such that the n wells 502 form a meander. Specifically, every two neighboring n wells 502 (or n well slices) are connected by an n well connection line 506, e.g. a metal line. At one end of the meander, the output of an input buffer 508 is connected to the meander (i.e. to the first n well in the serial connection of n wells 502). At the other end of the meander, the input of an output buffer 509 is connected to the meander (i.e. to the last n well in the serial connection of n wells 502).

For an integrity test or check (i.e. a test for checking whether there has been a backside attack on the chip 500), a test signal circuit (not shown in FIG. 5) may supply the test signal T (in other words a test enable signal) set to 1 to the control lines 507 to switch off p channel transistors 505, so that the n wells 502 are not connected to VnWell anymore. The test circuit may then supply an input (test) signal SI to the input buffer 508 which transfers the input signal SI to supply an input voltage VI (or an input current JI) to the first n well in the serial connection of n wells 502.

The output buffer 509 derives an output signal SO from the voltage VO (or current JO) which it receives from the last n well in the serial connection of n wells 502. A determiner (not shown in FIG. 5) may determine a behavior of the n wells 502 in response to the input (test) signal SI based on the output signal SO and a detector (not shown in FIG. 5) may detect a change of the n wells 502 or their surroundings (e.g. a thinning of the n wells 502 or the surrounding p substrate) based on the behavior and a reference behavior of the n wells 502 in response to the test signal, e.g. based on a reference value for the output signal SO as it can be expected if the n wells 502 or their surroundings have not been changed.

Thus, for T=1, the n well meander's integrity can be checked by applying one or more appropriate input signals SI to the input buffer 508 and by comparing the corresponding output signal(s) SO with expected values, e.g. for the n well meander's electrical characteristics like resistance $R_{nWell}$, capacitance $C_{nWell}$, time constant $RC_{nWell}$, etc., by means of appropriate (e.g. analogue) circuitry for supplying the input signal(s) SI to the input buffer 508 and evaluating the output signal(s) SO from the output buffer 509.

Instead of being connected by means of metal lines 506 to form an n well meander the n wells 502 may also be parts of one meander-shaped n well, or, in other words, the n wells 502 may be connected by n well regions. This is illustrated in FIG. 6.

Figure 6:
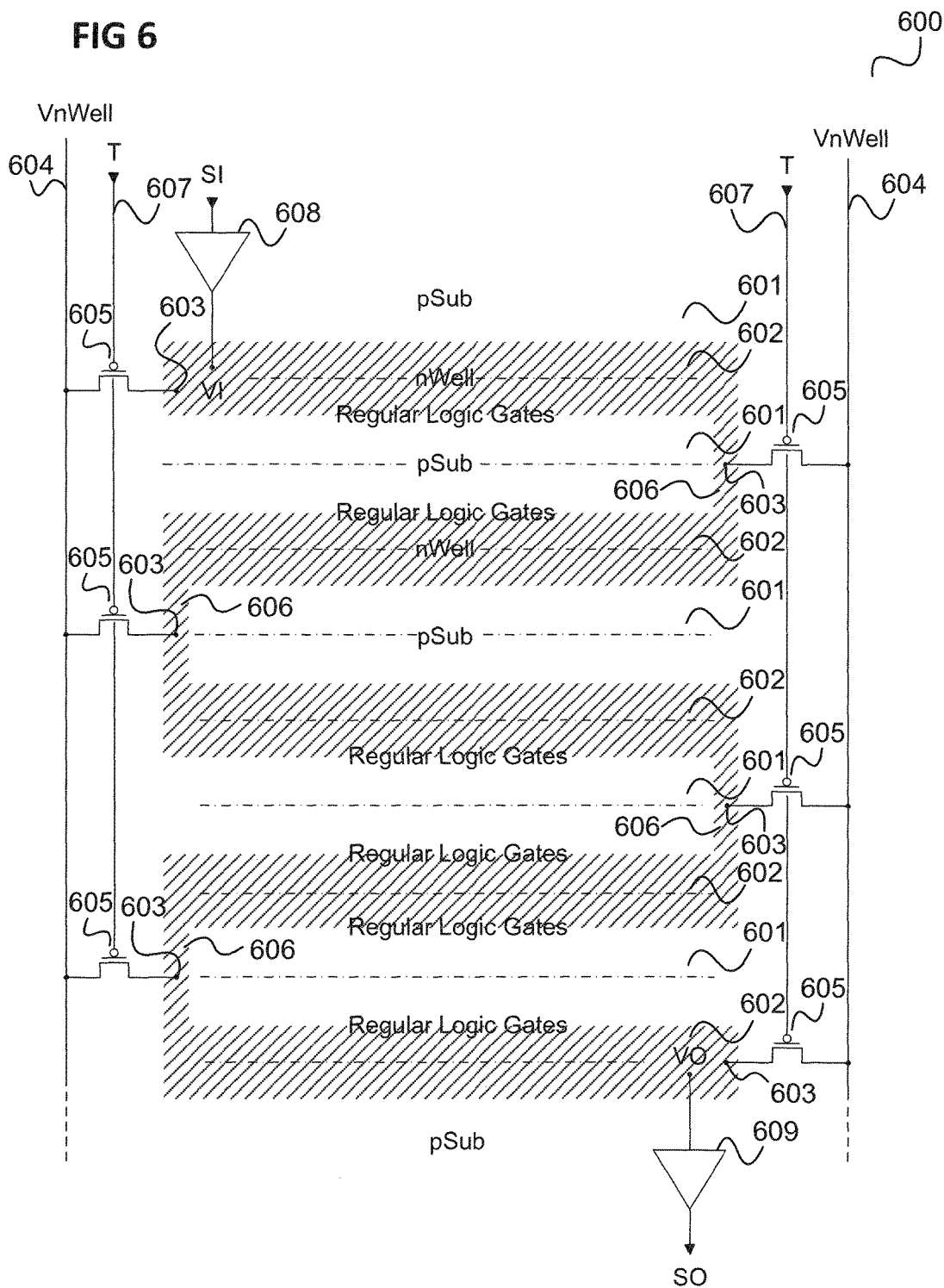
FIG. 6 shows a top view of a chip according to one embodiment.

FIG. 6 shows a chip 600.

Similarly to chip 500, the chip 600 includes p substrate regions 601, n wells 602, n well connection regions 603, n well voltage lines 604, p channel transistors 605, control lines 607, an input buffer 608 and an output buffer 609.

In this example, instead of the n well 602 being connected by n well connection (metal) lines 506 in the n wells 602 are connected by n well regions 606. In other words, the n wells 602 are parts of one big meander-shaped n well extending from the point of connection to the input buffer 608 to the point of connection to the output buffer 609. As illustrated, the n well connection regions 603 may lie within the n well regions 606.

Alternatively or in addition, similarly to the n well connection regions 304, the p+ substrate connection regions 302 may be switchably connected to one or more substrate voltage lines, e.g. by means of n channel transistors. The test circuit may then disconnect the p substrate from the substrate voltage and may, similarly as explained above for the n well meander, supply via an input buffer an input signal via one of p+ substrate connection regions 302 (e.g. the leftmost p+ substrate connection region 302 in FIG. 3 whose potential is denoted VpSub(0)) and an output signal received from an output buffer (e.g. connected to the rightmost p+ substrate connection region 302 in FIG. 3 whose potential is denoted VpSub(3)) may be analyzed (by a determiner and a detector) to detect a backside attack. For example, electrical characteristics of the p substrate 301 may be compared to reference characteristics such that a manipulation of the p substrate 301 can be detected. For example, the electrical resistance between the p+ substrate connection regions is significantly changed if the p substrate 301 is thinned (which is necessary for a backside attack).

Figure 7:
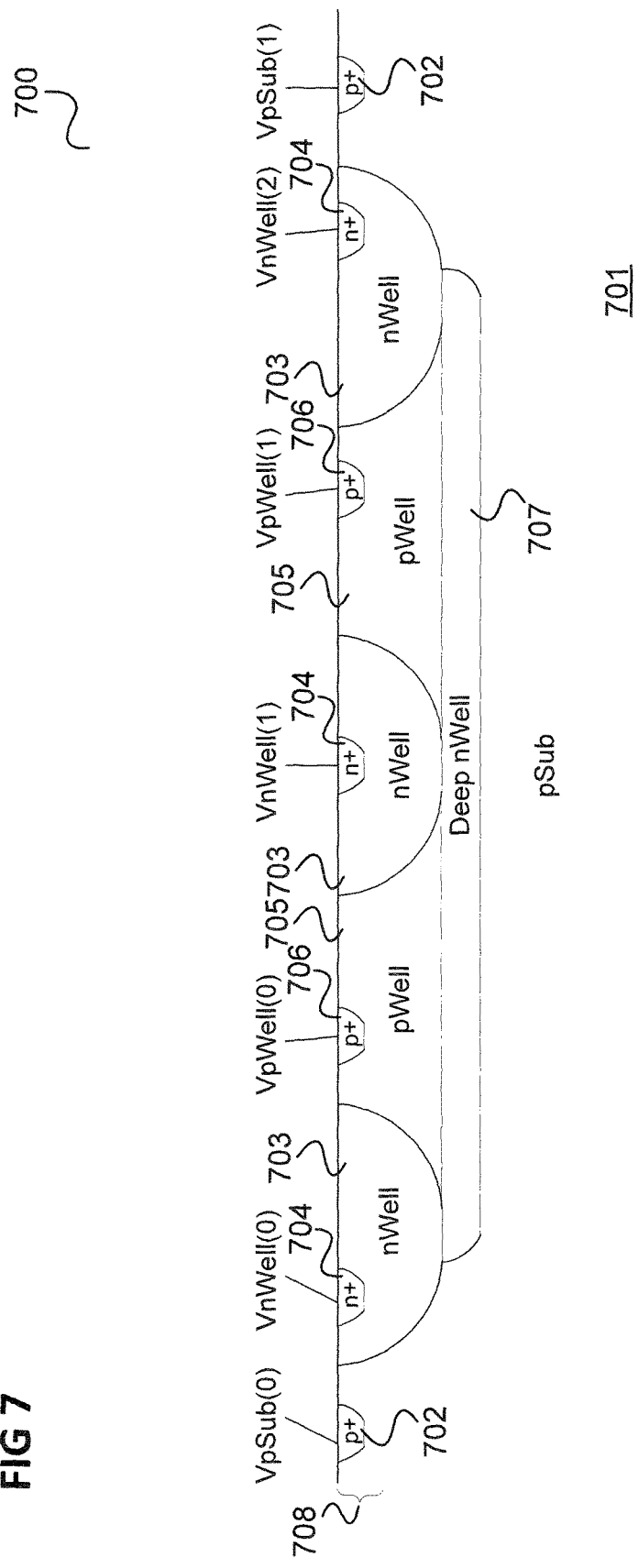
FIG. 7 shows a chip according to another embodiment.

FIG. 7 shows a chip 700 according to another embodiment.

Similarly to the chip 300, the chip 700 includes a p substrate 701 wherein a plurality of p+ substrate connection regions 702 are formed within the p substrate 701 and a plurality of n wells 703 wherein a plurality of n+ connection regions 704 are formed within the n wells 703.

In contrast to the chip 300, the chip 700 is an example of a chip manufactured in a triple well CMOS process. Accordingly, the n-wells 703 are separated by p-wells 705 wherein a plurality of p+ well connection regions 706 are formed within the p wells 705 that are connected via a deep n-well 707 formed within the p-substrate 701. It is important to note that the p wells are separated from the p substrate (by means of the deep n-well) so that the electrical potentials of p-substrate and p-well may be different.

The respective local bulk potentials VpSub(j) (for the p+ substrate connection regions 702), VnWell(k) (for the n well connection regions 704) and VpWell(m) (for the p well connection regions 706) are indicated as well in FIG. 7. The connection regions 702, 704, 706 may for example be connected via low-ohmic connections to the supply voltages, i.e. such that VpSub(j)=VSS for all j=0, 1, . . . , VnWell(k)=VDD for all k=0, 1, 2, . . . and VpWell(m)=VSS for all m=0, 1, . . . .

Similarly to the chip 300, n channel transistors (not shown) are for example formed in a transistor level 708 within the p substrate 701 or the p wells 705 and p channel transistors (not shown) are for example formed in the transistor level 708 within the n wells 703. These transistors may for example be connected to form logic gates.

Figure 8:
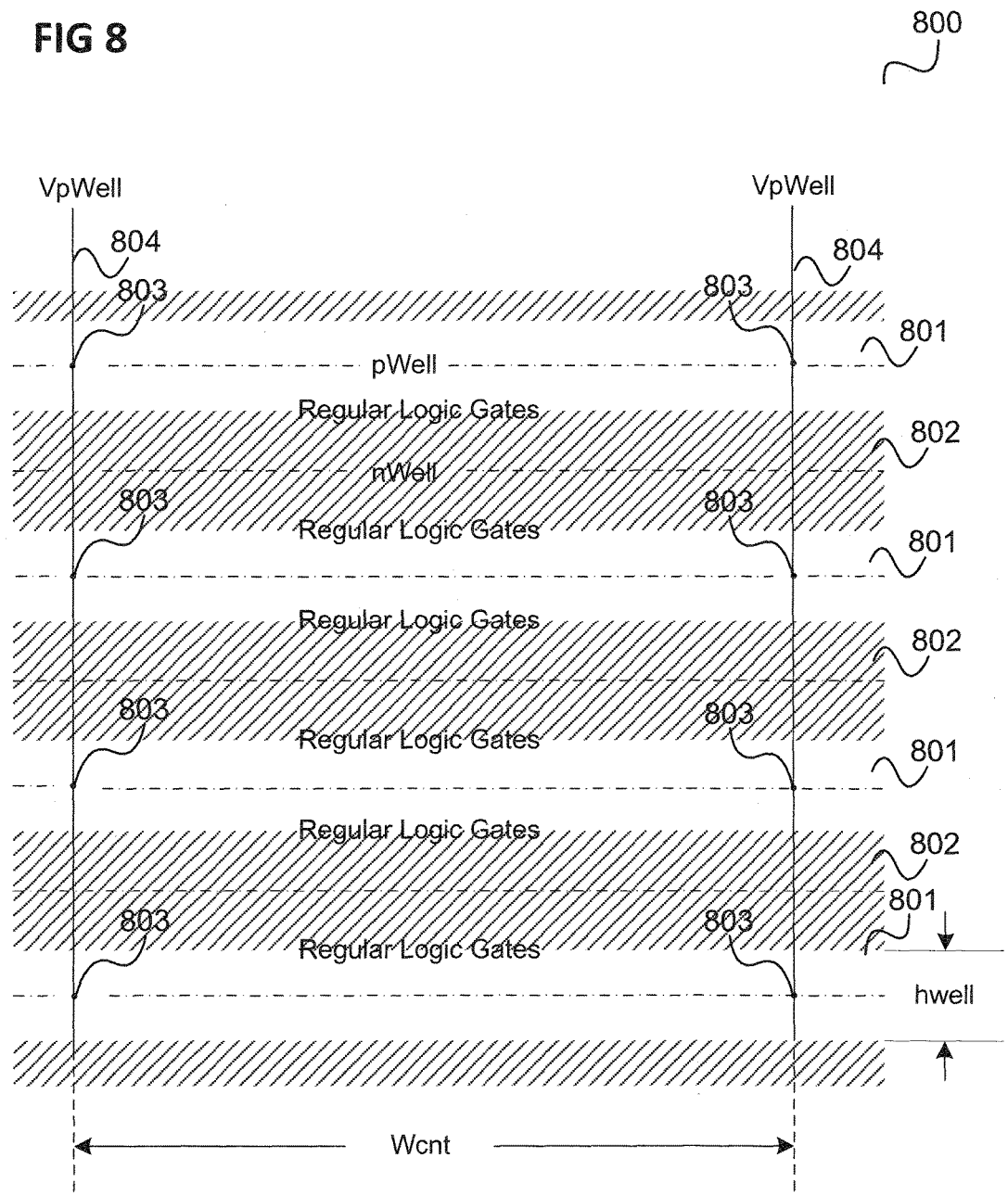
FIG. 8 shows a top view of the chip of FIG. 7.

FIG. 8 shows a top view of the chip 700 of FIG. 7.

The cross section of FIG. 7 is for example a cross section of the chip 800 shown in FIG. 8 from top to bottom wherein a higher number of p wells 705 is assumed than illustrated in FIG. 7 (i.e. the p wells 705 are assumed to continue further to the left and right in the chip 700).

Accordingly, chip 800 includes p wells 801 separated by n wells 802. The p wells 801 are supplied by p well connection regions 803 (corresponding to p well connection regions 706) by means of p well voltage lines 804 with the p well supply voltage VpWell.

According to one embodiment, the p wells 801 are switchably connected to the p well voltage lines 804. This is illustrated in FIG. 9.

Figure 9:
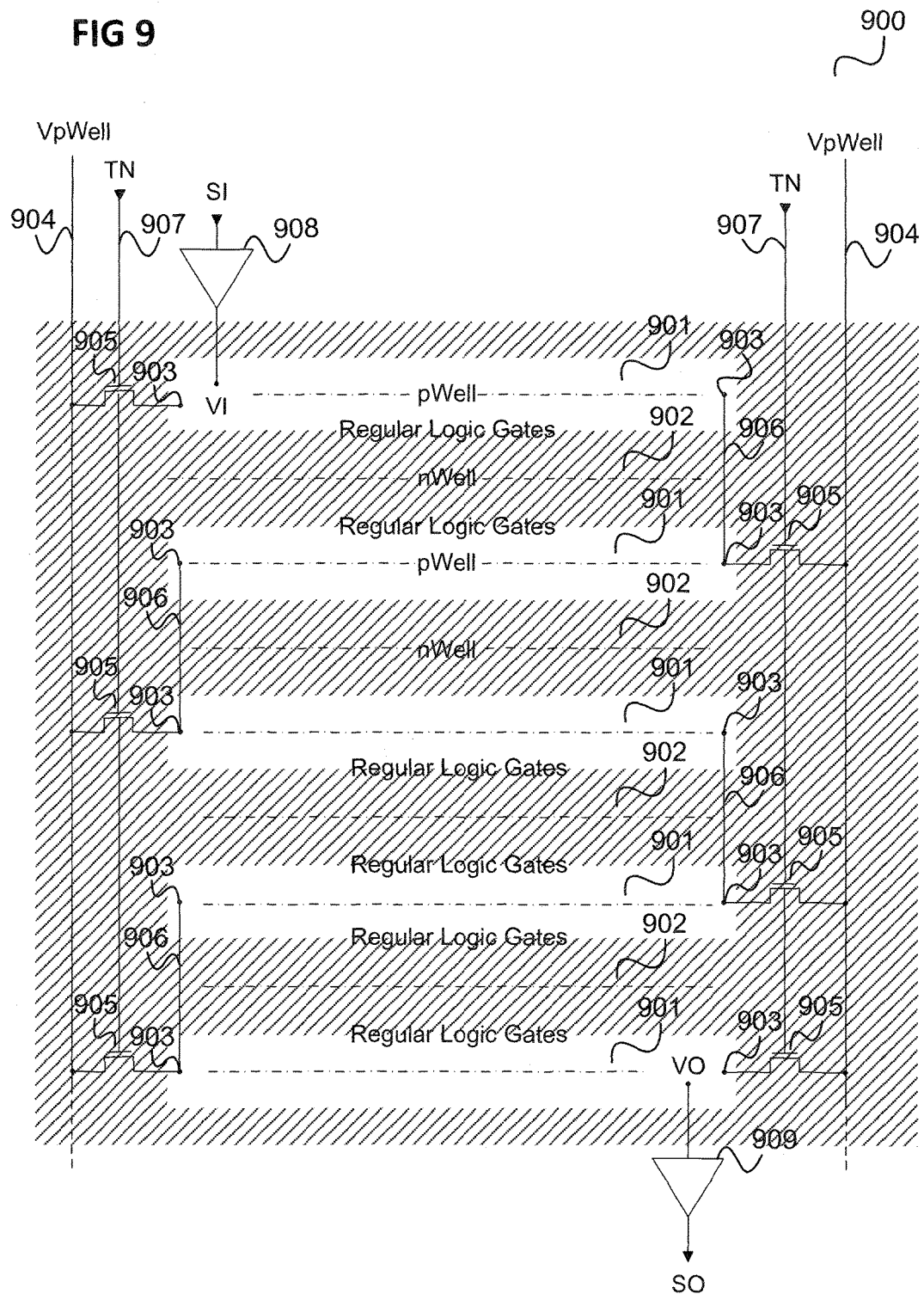
FIG. 9 shows a top view of a chip according to one embodiment.

FIG. 9 shows a top view of a chip 900.

Similar to FIG. 8, the chip 900 includes p wells 901 separated by n wells 902 and including p well connection regions 903 and p well voltage lines 904. In this example, as illustrated, the p wells 901 are also surrounded to the left and right by the n wells 902.

The p well voltage lines 904 are switchably connected to the p well connection regions 903 by means of n channel transistors 905 whose gate terminals are connected to control lines 907. Each n channel transistor 905 (e.g. nMOS transistor) is for example physically implemented inside a p well 901. In FIG. 9, each n channel transistor 905 is drawn adjacent to a p well 901 for clarity but it may be formed within this p well 901.

In normal operation (i.e. not test mode) the gates of the n channel transistors 905 are supplied with a test signal TN set to 1 (i.e. for example high supply voltage VDD) such that the n channel transistors 905 are switched on and connect the p wells 901 to VpWell, which is for example equal to the low supply potential VSS.

Furthermore the p wells 901 are serially connected via the p well connection regions 903 by means of p well connection lines 906 such that the p wells 901 form a meander. At one end of the meander, the output of an input buffer 908 is connected to the meander (i.e. to the first p well in the serial connection of p wells 901). At the other end of the meander, the input of an output buffer 909 is connected to the meander (i.e. to the last p well in the serial connection of p wells 901).

For an integrity test (i.e. a test for checking whether there has been a backside attack on the chip 900), a test circuit (not shown in FIG. 9) may supply the test signal TN set to 0 (e.g. VSS) to the control lines 907 to switch off n channel transistors 905, so that the p wells 901 are not connected to VpWell anymore. The test circuit may then supply an input (test) signal SI to the input buffer 908 which transfers the input signal SI to supply an input voltage VI (or an input current JI) to the first p well in the serial connection of p wells 901.

The output buffer 909 derives an output signal SO from the voltage VO (or current JO) which it receives from the last p well in the serial connection of p wells 901. A determiner (not shown in FIG. 9) may determine a behavior of the p wells 901 in response to the input (test) signal SI based on the output signal SO and a detector (not shown in FIG. 9) may detect a change of the p wells 901 or their surroundings (e.g. a thinning of the p wells 901 or the surrounding p substrate) based on the behavior and a reference behavior of the p wells 901 in response to the test signal, e.g. based on a reference value for the output signal SO as it can be expected if the p wells 901 or their surroundings have not been changed.

Thus, for TN=0, the p well meander's integrity can be checked by applying one or more appropriate input signals SI to the input buffer 908 and by comparing the corresponding output signal(s) SO with expected values, e.g. for the p well meander's electrical characteristics like resistance $R_{pwell}$, capacitance $C_{pwell}$, time constant $RC_{pWell}$, etc., by means of appropriate (e.g. analogue) circuitry for supplying the input signal(s) SI to the input buffer 908 and evaluating the output signal(s) SO from the output buffer 909.

Instead of being connected by means of metal lines 906 to form a p well meander the p wells 901 may also be parts of one meander-shaped p well, or, in other words, the p wells 901 may be connected by p well regions. This is illustrated in FIG. 10.

Figure 10:
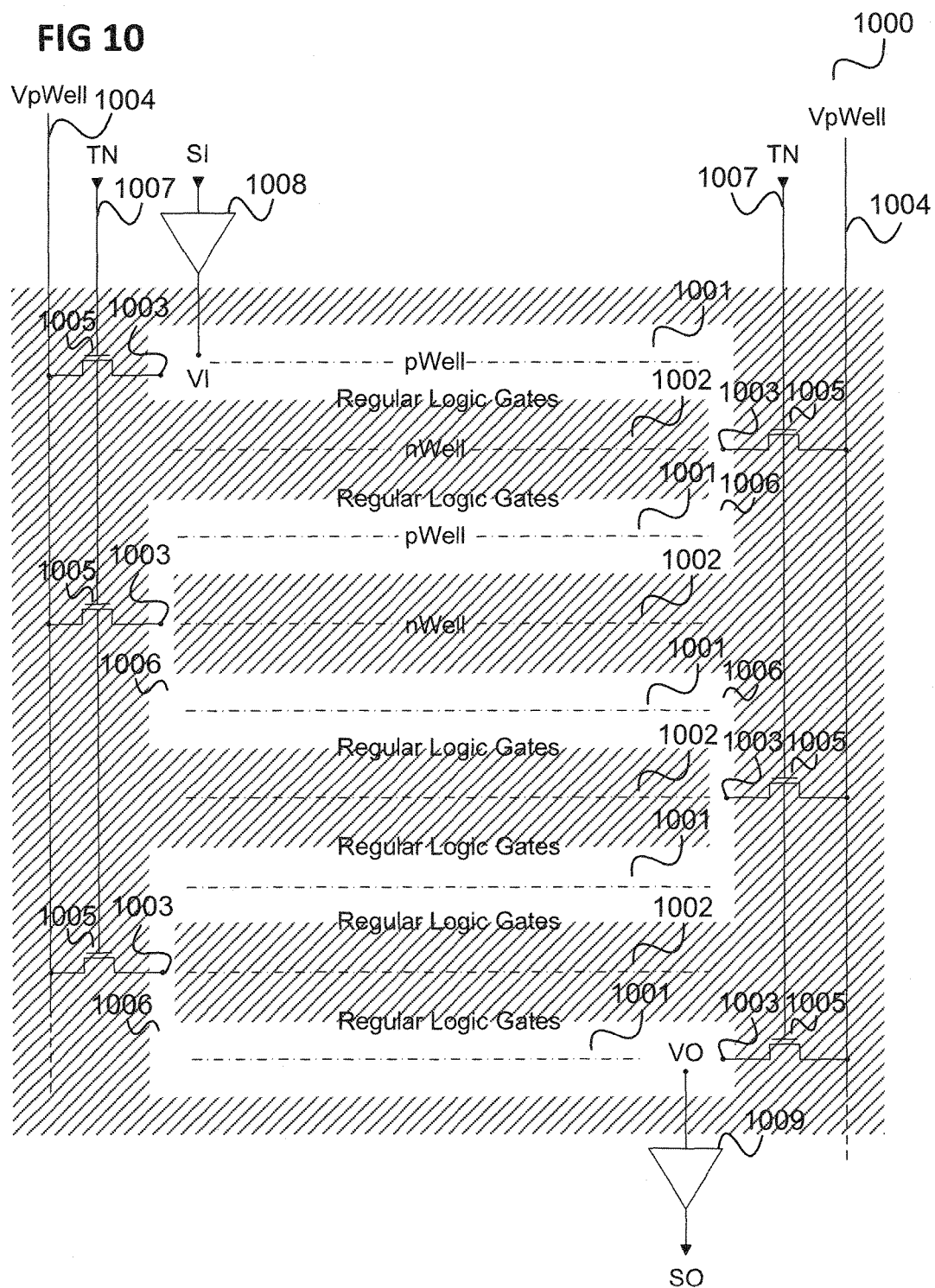
FIG. 10 shows a top view of a chip according to one embodiment.

FIG. 10 shows a chip 1000.

Similarly to chip 900, the chip 1000 includes p wells 1001, n wells 1002, p well connection regions 1003, p well voltage lines 1004, n channel transistors 1006, control lines 1007, an input buffer 1008 and an output buffer 1009.

In this example, instead of the p well 1001 being connected by p well connection (metal) lines 906 the p wells 1001 are connected by p well regions 1006. In other words, the p wells 1001 are parts of one big meander-shaped p well extending from the point of connection to the input buffer 1008 to the point of connection to the output buffer 1009.

In the following, examples for the evaluation of the response of a semiconductor region such as the serial connection of n wells 502 or the serial connection of p wells 901 to an input test signal are given.

Figure 11:
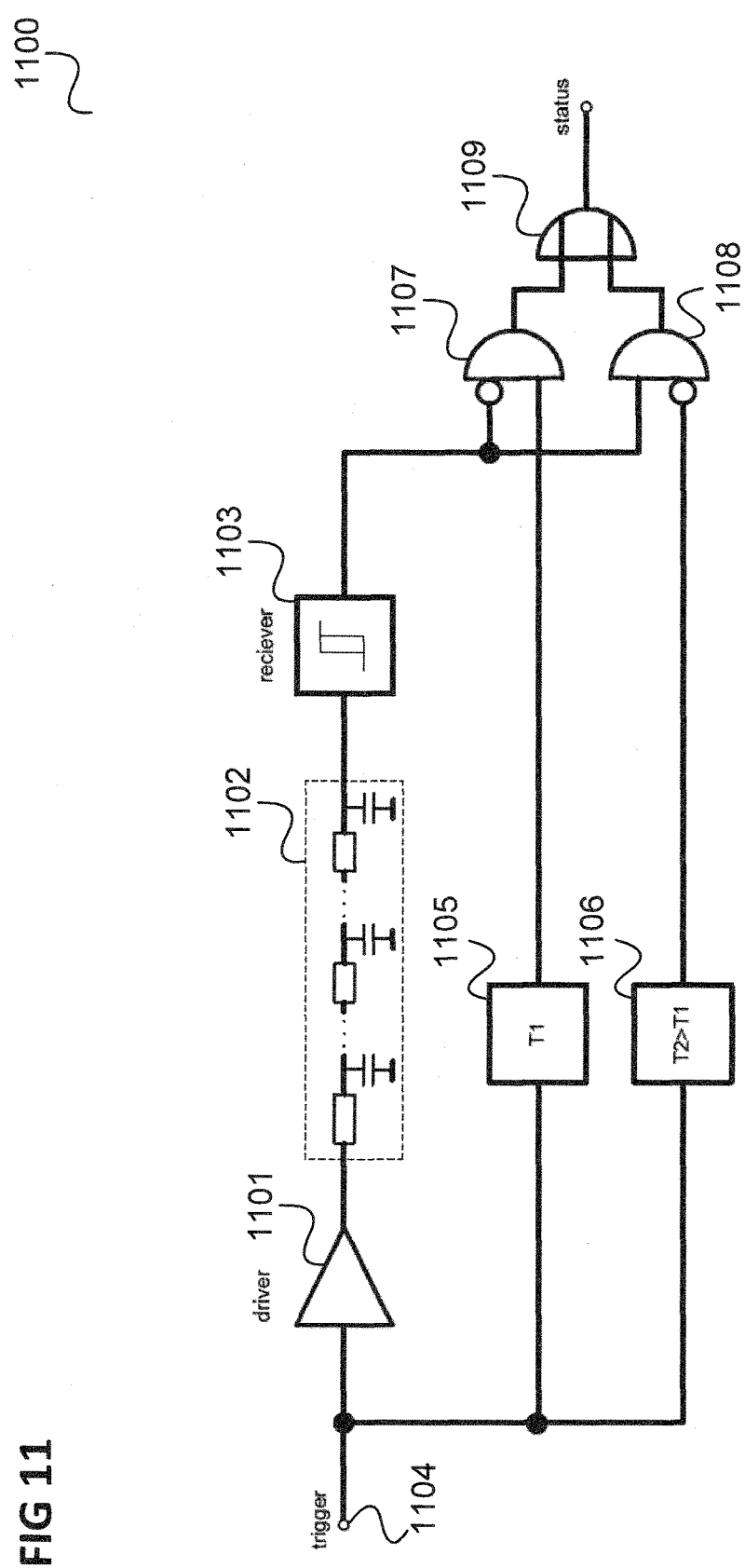
FIG. 11 shows a test circuit arrangement according to one embodiment.

FIG. 11 shows a test circuit arrangement 1100.

The test circuit arrangement 1100 includes an input circuit (or driver) 1101 which for example corresponds to the input buffer (508, 608, 908, 1008). A serial connection of RC circuits 1102 is in this example used as a representation (in other words as a model) for the serial connection of n wells 502 or the serial connection of p wells 902 or, for other embodiments, a serial connection of one or more substrate regions etc. Accordingly, the serial connection of RC circuits 1102 is connected to the output of the input circuit 1101 and to the input of an output circuit 1103 corresponding to the output buffer (509, 609, 909, 1009).

In this example, the electrical parameters of the serial connection of RC circuits 1102 are evaluated by driving it in a digital manner by CMOS logic and evaluating the delay time of an input pulse.

Specifically, a falling input or trigger pulse is supplied from an input 1104 to the input circuit 1101 as well as to a first delay element 1105 and a second delay element 1106. The first delay element 1105 delays the pulse by a time T1 and the second delay element 1106 delays the pulse by a time T2 which is higher than time T1.

The output of the first delay element 1105 is connected to a first input of a first AND gate 1107. The output of the output circuit 1103 is connected to an inverted second input of the first AND gate 1107. The output of the first AND gate 1107 thus indicates with a high output state that the pulse has reached the first AND gate 1107 via the first delay element 1105 earlier than via the serial connection of RC circuits 1102 and thus that the delay of the serial connection of RC circuits 1102 is higher than T1.

The output of the second delay element 1106 is connected to an inverted first input of a second AND gate 1108. The output of the output circuit 1103 is connected to an second input of the second AND gate 1108. The output of the second AND gate 1108 thus indicates with a high output state that the pulse has reached the second AND gate 1108 via the second delay element 1106 later than via the serial connection of RC circuits 1102 and thus that the delay of the serial connection of RC circuits 1102 is lower than T2.

The outputs of the first AND gate 1107 and the second AND gate 1108 may be combined with a logic block, e.g. an OR gate 1109. Based on the output of the logic block 1109, it can be determined whether the delay of the serial connection of RC circuits 1102 is between the lower bound T1 and the upper bound T2. For example, a detector receives the output of the OR gate 1109, checks whether the delay of the serial connection of RC circuits 1102 is between T1 and T2 and outputs an alarm signal if the delay of the serial connection of RC circuits 1102 is not between T1 and T2, e.g. an alarm signal that disables one or more components of the chip including the serial connection of RC circuits 1102.

As output circuit 1103 a Schmitt trigger (as illustrated in FIG. 11) may be used to increase robustness or a comparator may be used to improve accuracy.

Electrical parameters of the serial connection of RC circuits 1102 may also be measured separately (while the measuring of delay may be seen as a combined measurement of resistance and capacity). In this case, comparison to an upper and/or lower bound may be easier to implement and may provide sufficient accuracy to achieve the required sensitivity to manipulation.

Figure 12:
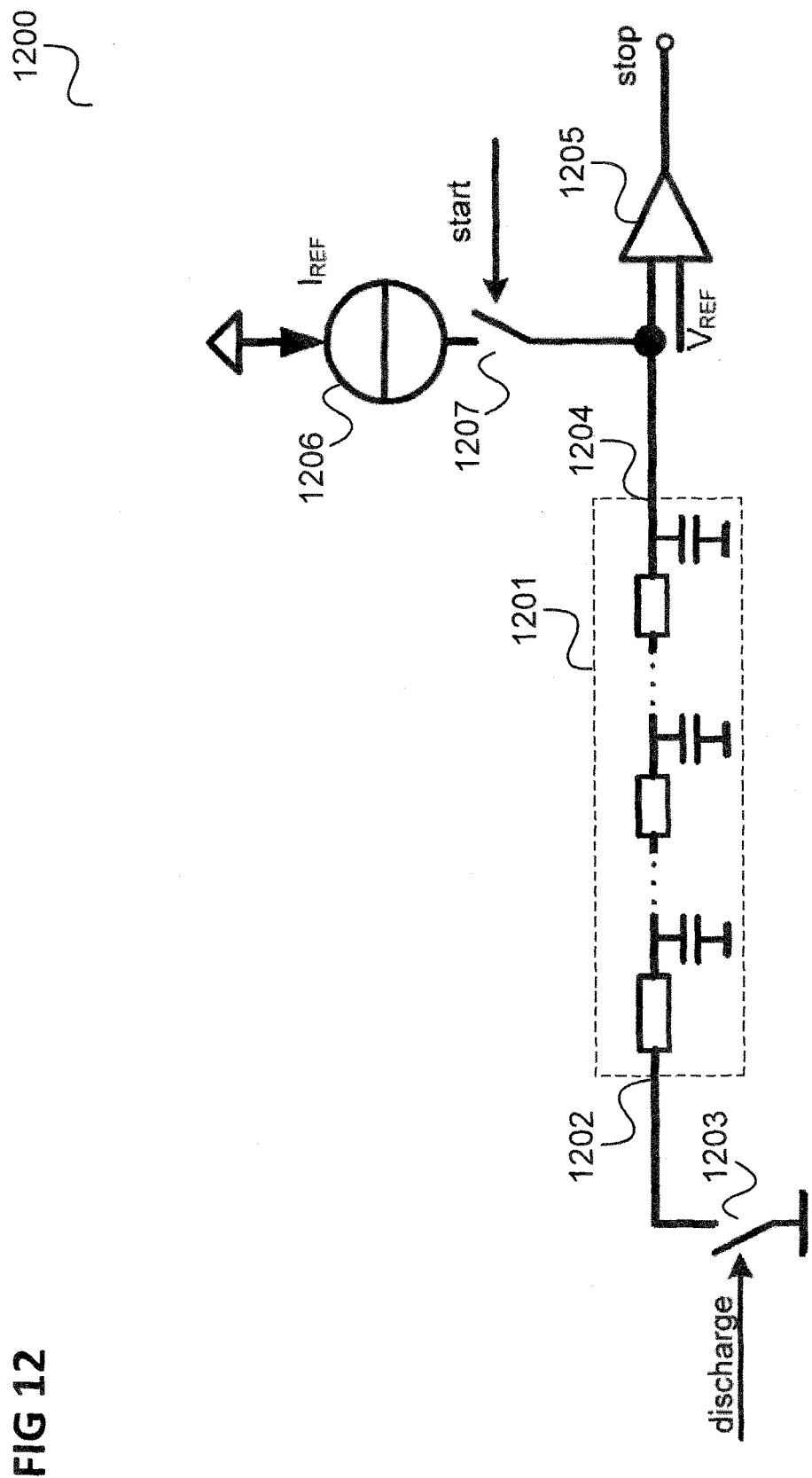
FIG. 12 shows a test circuit arrangement according to another embodiment.

FIG. 12 shows a test circuit arrangement 1200 for estimation of the capacitance of the serial connection of RC circuits.

The test circuit arrangement 1200 includes a serial connection of RC circuits 1201. In this example, the serial connection of RC circuits 1201 is on a first side 1202 connected to a first switch 1203 which allows to connect the serial connection of RC circuits 1201 to the low supply potential (e.g. ground). On the second side 1204, the serial connection of RC circuits 1201 is connected to the first input of an operational amplifier 1205. The second input of the operational amplifier is supplied with a reference voltage $V_{ref}$ In contrast to the examples described above with reference to FIGS. 5, 6, 9 and 10 where the input circuit and the output circuit are arranged on different sides of the serial connection of p wells or n wells, FIG. 12 can be seen as an example where the input circuit in form of a current source 1206 and the output circuit in form of the operational amplifier 1205 can be connected to the same side of the serial connection of RC circuits 1201.

For an integrity check, the serial connection of RC circuits 1201 is first discharged via the first switch 1203. After discharging, a second switch 1207 connected between the current source 1206 and the second side of the serial connection of RC circuits 1201 is closed for a predefined time such that the current source 1206 supplies a reference current $I_{REF}$ to the serial connection of RC circuits 1201 for the predefined time. After supplying the reference current, the output of the operational amplifier 1205 indicates whether the capacitance of the serial connection of RC circuits 1201 is such that the voltage at the second side 1204 of the serial connection of RC circuits 1201 is above or below $V_{REF}$ which for example corresponds to a predetermined reference capacity.

Alternatively, a timer is started when the second switch 1207 is closed and stopped when the output of operational amplifier 1205 changes (i.e. the voltage at the second side 1204 of the serial connection of RC circuits 1201 has reached $V_{REF}$) and the time measured by the timer is compared with a reference time corresponding to a reference capacity. Similarly as for the example given with reference to FIG. 11, a detector may for example output an alarm signal if the measured capacity differs (e.g. by more than a certain threshold) from the reference capacity.

Figure 13:
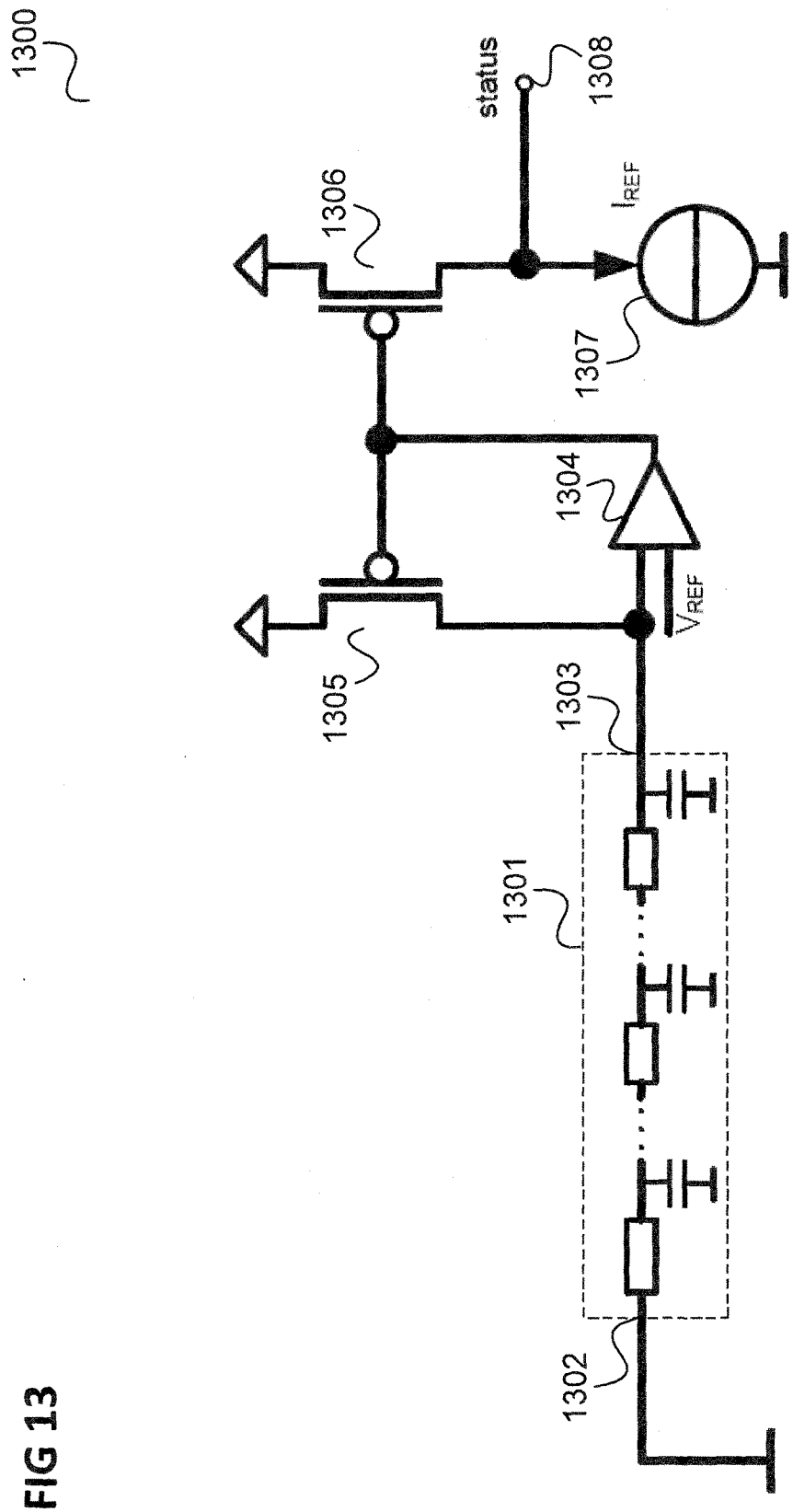
FIG. 13 shows a test circuit arrangement according to a further embodiment.

An example where the resistance of the serial connection of wells (or substrate regions) is determined and checked is illustrated in FIG. 13.

FIG. 13 shows a test circuit arrangement 1300.

The test circuit arrangement 1300 includes a serial connection of RC circuits 1301 whose first side 1302 is connected to the low supply potential (e.g. ground) and whose second side 1303 is connected to the first input of an operational amplifier 1304 whose second input is supplied with a reference voltage $V_{ref}$ Similarly to the test circuit arrangement 1200, the test circuit arrangement 1300 can be seen as an example where the input circuit (here in the form of a first p channel (e.g. pMOS) field effect transistor (FET) 1305) and the output circuit (here in form of the operational amplifier 1304) are connected to the same side of the serial connection of RC circuits 1301.

The first p channel FET 1305 is connected, with its source terminal and drain terminal, between the high supply potential (e.g. VDD) and the second side of the serial connection of RC circuits 1301. The gate of the first p channel FET 1305 is connected to the gate of a second p channel FET 1306 whose source is connected to the high supply potential and whose drain is connected to a current source 1307.

The operational amplifier controls the gate voltages of the p channel FETs 1305, 1306 such that the current supplied by the first p channel FET 1305 to the serial connection of RC circuits 1302 has a magnitude such that the voltage drop over the serial connection of RC circuits 1302 from the second side 1303 to the first side 1302 is equal to $V_{REF}$. The second p channel FET 1306 is assumed to have the same dimension as the first p channel FET 1305 such that a current of the same magnitude flows through the second p channel FET 1306. Accordingly, the output from an output terminal connected to the drain terminal of the second p channel FET 1306 indicates whether the current through the FETs 1305, 1306 is below or above $I_{REF}$. By setting $I_{REF}$ such that the current through the FETs 1305, 1306 is equal to $I_{REF}$ when the resistance of the serial connection of RC circuits 1301 is equal to a reference resistance, a detector may thus determine based on the output whether the resistance of the serial connection of RC circuits 1301 has changed and, for example, output an alarm signal if there is a change, e.g. exceeding a predetermined allowed threshold.

The voltage $V_{REF}$ which results at the second side of the serial connection of RC circuits 1302 can be seen as the input test signal in this case and the current through the first p channel FET 1305, i.e. the current consumed by the serial connection of RC circuits 1302 in response to this voltage can be seen as the behavior of the serial connection of RC circuits 1302 in response to voltage (i.e. in response to the test signal).

Thus, the test circuit arrangement 1300 can be seen as an example of application of a defined voltage (by means of the operational amplifier 1304) and evaluation of the resulting current. In the following, an example is given in which a predefined current is applied and the resulting voltage is evaluated.

Figure 14:
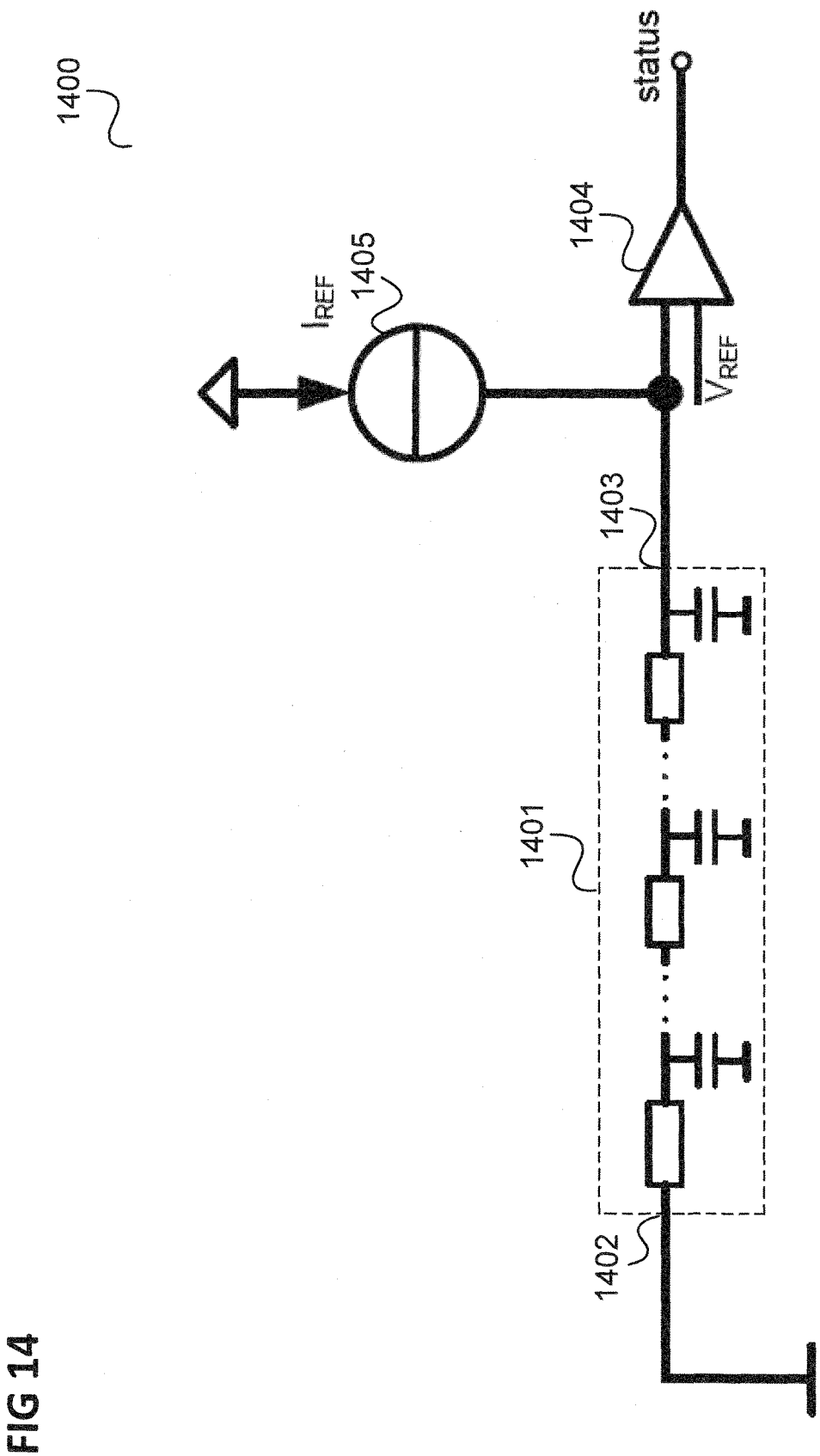
FIG. 14 shows a test circuit arrangement according to a further embodiment.

FIG. 14 shows a test circuit arrangement 1400.

The test circuit arrangement 1400 includes a serial connection of RC circuits 1401 whose first side 1402 is connected to the low supply potential (e.g. ground) and whose second side 1402 is connected to the first input of an operational amplifier 1404 whose second input is supplied with a reference voltage $V_{ref}$ Similarly to the test circuit arrangements 1200, 1300, the test circuit arrangement 1400 can be seen as an example where the input circuit (here in the form of a current source 1405) and the output circuit (here in form of the operational amplifier 1404) are connected to the same side of the serial connection of RC circuits 1401.

The current source 1405 is configured to supply a predetermined reference current $I_{REF}$ to the serial connection of RC circuits 1402 which is dimensioned such that the voltage at the second side 1403 is equal to the reference voltage $V_{ref}$ if the resistance of the serial connection of RC circuits 1402 is equal to a reference resistance. Thus, a detector connected to the output of the operational amplifier 1404 may detect whether the resistance of the serial connection of RC circuits 1402 has been changed from the reference resistance and for example output an alarm signal if this is the case.

The current supplied from the current source 1405 can be seen as the input test signal in this case and the voltage at the second side of the serial connection of RC circuits 1402 can be seen as the behavior of the serial connection of RC circuits 1402 in response to the supply of current (i.e. in response to the test signal).

In the above examples, the behavior of a single serial connection of wells (or substrate regions) is evaluated. Alternatively, the behaviour of two or more equally implemented serial connections of wells (or substrate regions) can be compared with respect to their electrical characteristics (such as resistance and/or capacity) in order to check their integrity.

In the examples illustrated in FIGS. 9 and 10, backside attacks to the chip's active layers (like source/drain diffusion layers, gate polysilicon layers, metal wiring layers, etc.) that sufficiently modify one or more p wells can be detected. In other words, in this protection scenario, the attacker is forced to either drill only very small holes through p well regions or to attack only n well regions. In both cases, because of the typical small lateral dimensions (hwell is for example approximately 2 µm) of the p well slices 901, 1001 and n well slices 902, 1002, any attack navigation across the chips backside will be significantly hampered so that any reliable identification of potential attack targets becomes virtually impossible by increasing the attacker's failure risk to an unacceptable level.

Alternatively to employing switchable p well connectivity (alone), similar backside protection measures can be implemented by providing (additionally) switchable n well and/or p substrate connectivity as explained with reference to FIGS. 5 and 6. This also allows for using, e.g., the capacitance between (appropriately subdivided) portions of n well regions and p well regions of the chip (e.g. the n well and p well of a Full-Custom Macro like a memory or a datapath coprocessor) for integrity checking.

An integrity check as for example described above can be performed either during a dedicated time interval without normal chip operation or in parallel to normal chip operation. In the latter case the voltage swing on the checked well is for example limited to not disturb normal operation more than necessary. If this constraint is taken into account it is for example sufficient to ensure that no hold- or setup time violations of critical data pathes can occur caused by modified MOS threshold voltages due to the p well (or n well) body effect. To this end, appropriate margins can for example be incorporated into the for example CMOS logic's timing characterisation files for e.g. static timing analysis within the design flow.

When the chip is operated, the measured characteristics (i.e. the determined behaviour) are checked (e.g. by a detector) against expected values or against each other. This may happen after every reset of the chip, on a regular basis after a fixed time, continuously, or be triggered by a special event or under software control. For example, as mentioned above, only if the measured and the expected values match, the chip continues its normal operation, otherwise a suitable response is triggered, like the raising of an alarm plus ceasing of operation of one more components of the chip.

In one embodiment, suitable margins are employed for the comparison of the measured characteristics to the expected values (i.e. to the reference values) to account for normal deviations from the expected (normal) state that are caused e.g. by temperature variations, voltage variations, or aging of the circuitry. For example, a deviation of 10% (or another predetermined percentage) is allowed.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A device configured to determine an attack on a chip; wherein the device comprises:
   a transistor level;
   a semiconductor region in, below, or in and below the transistor level;
   a test signal circuit configured to supply a test signal to the semiconductor region;
   wherein the test signal circuit is disposed in the transistor level;
   a determiner configured to determine an electrical parameter of the semiconductor region in response to the test signal;
   a detector configured to detect a change of the semiconductor region's geometry based on the electrical parameter and a reference electrical parameter of the semiconductor region in response to the test signal.

2. Device according to claim 1, wherein the chip comprises a substrate and the semiconductor region is a substrate region.

3. Device according to claim 2, wherein the semiconductor region comprises or is a region of the substrate.

4. Device according to claim 2, wherein the semiconductor region comprises or is a well in the substrate.

5. Device according to claim 1, wherein the semiconductor region comprises or is a doped region.

6. Device according to claim 1, wherein the detector is configured to detect a mechanical change of the semiconductor region based on the electrical parameter and the reference electrical parameter by checking whether the electrical parameter matches the reference electrical parameter.

7. Device according to claim 6, wherein checking whether the electrical parameter matches the reference electrical parameter includes checking whether a value representing the electrical parameter lies within a predetermined range of a value representing the reference electrical parameter.

8. Device according to claim 1, wherein the detector is configured to output an alarm signal if it detects a change of geometry of the substrate of the semiconductor region.

9. Device according to claim 1, further comprising a controller configured to prevent the function of one or more components of the chip if the detector detects a change of geometry of the substrate of the semiconductor region.

10. Device according to claim 1, wherein the electrical parameter comprises at least one of a capacity, a resistance or a time constant of the semiconductor region.

11. Device according to claim 1, wherein the semiconductor region includes a plurality of semiconductor subregions, wherein the chip comprises, for each semiconductor subregion, at least one switch to connect the semiconductor subregion with a supply potential and the test circuit is configured to disconnect each semiconductor subregion from the supply potential by means of the at least one switch before supplying the test signal to the semiconductor region.

12. Device according to claim 11, wherein the semiconductor region is a serial connection of the plurality of semiconductor subregions.

13. Device according to claim 1, comprising a memory storing the reference electrical parameter.

14. Device according to claim 1, comprising a further semiconductor region, a further test circuit configured to supply a further test signal to the further semiconductor region, and a further determiner configured to determine an electrical parameter of the further semiconductor region in response to the test signal wherein the detector is configured to use the electrical parameter of the further semiconductor region in response to the test signal as the reference electrical parameter of the semiconductor region in response to the test signal.

15. Method for determining an attack on a chip; wherein the method comprises:
   supplying a test signal to a semiconductor region in, below, or in and below a transistor level of the chip; wherein the supplying the test signal occurs using a test signal circuit disposed in the transistor level;

determining an electrical parameter of the semiconductor region in response to the test signal;

detecting a change of geometry of the semiconductor region based on the electrical parameter and a reference electrical parameter of the semiconductor region in response to the test signal; and outputting an alarm signal if the electrical parameter exceeds a predetermined threshold.

16. Device according to claim 1, wherein the change in the thickness of at least a part of the substrate occurs because of a thinning of the substrate on a side of the substrate opposite the transistor level.

17. The method according to claim 15, wherein the alarm signal disables one or more components of the chip.

18. The device according to claim 1, wherein the determiner is disposed in the transistor level.

* * * * *